(12) United States Patent
Yang et al.

(10) Patent No.: US 11,791,664 B2
(45) Date of Patent: Oct. 17, 2023

(54) OBJECT DETECTION APPARATUS AND METHOD FOR WIRELESS POWER TRANSFER SYSTEM

(71) Applicant: NuVolta Technologies (Hefei) Co., Ltd., Hefei (CN)

(72) Inventors: Min Yang, Shanghai (CN); Zeng Li, Shanghai (CN); Junxiao Chen, Shanghai (CN); Wei Zheng, Bedford, NH (US); Zhijun Luo, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 517 days.

(21) Appl. No.: 16/922,247

(22) Filed: Jul. 7, 2020

(65) Prior Publication Data

US 2021/0408837 A1 Dec. 30, 2021

(30) Foreign Application Priority Data

Jun. 28, 2020 (CN) .......................... 202010597967.8

(51) Int. Cl.
*H02J 50/60* (2016.01)
*H02J 50/12* (2016.01)
*G01V 3/10* (2006.01)

(52) U.S. Cl.
CPC .............. *H02J 50/60* (2016.02); *G01V 3/101* (2013.01); *H02J 50/12* (2016.02)

(58) Field of Classification Search
CPC .......... H02J 50/60; H02J 50/12; G01V 3/101; G01V 3/10
See application file for complete search history.

(56) References Cited

U.S. PATENT DOCUMENTS

| | | | | |
|---|---|---|---|---|
| 2010/0084918 | A1* | 4/2010 | Fells | H02J 50/402 307/32 |
| 2013/0257168 | A1* | 10/2013 | Singh | H02J 50/12 307/104 |
| 2015/0285926 | A1* | 10/2015 | Oettinger | H02J 50/70 307/104 |
| 2017/0117755 | A1* | 4/2017 | Muratov | H02J 50/10 |
| 2017/0237290 | A1* | 8/2017 | Bakker | H02J 50/60 307/104 |
| 2017/0271908 | A1* | 9/2017 | Li | G01R 27/2688 |
| 2019/0393732 | A1* | 12/2019 | Oshima | H02J 50/60 |

* cited by examiner

*Primary Examiner* — Daniel R Miller
(74) *Attorney, Agent, or Firm* — AAP Law Firm PLLC (57) ABSTRACT

A method includes configuring a wireless power transfer system to operate in a sleep mode to reduce a quiescent current of the wireless power transfer system, configuring the wireless power transfer system to operate in a magnetic detection mode, wherein in the magnetic detection mode, an excitation is applied to a resonant tank of the wireless power transfer system, detecting a signal having a resonant attenuation envelope, wherein the signal is generated by the resonant tank, and configuring the wireless power transfer system to operate in an active mode after finding an object is magnetically coupled to the wireless power transfer system.

18 Claims, 6 Drawing Sheets

OBJECT DETECTION APPARATUS AND METHOD FOR WIRELESS POWER TRANSFER SYSTEM

PRIORITY CLAIM

This application claims priority to Chinese Patent Application No. 202010597967.8, filed on Jun. 28, 2020, which is hereby incorporated by reference in its entirety.

TECHNICAL FIELD

The present invention relates to an object detection apparatus and method, and, in particular embodiments, to an object detection apparatus for a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In order to increase the system efficiency of a wireless power transfer system, it is necessary to reduce power consumption as much as possible. For example, when a receiver is not magnetically coupled to a transmitter, the transmitter is configured to leave an active mode (e.g., a normal operation mode) and enter into in a reduced power mode (e.g., a sleep mode). In the active mode, control circuits (e.g., microcontroller) and power management circuits (e.g., power stage coupled to the transmitter) of the wireless power transfer system are fully powered. The power is transferred from the transmitter to the receiver. In the sleep mode, only the control circuits and the wake-up sources are powered. As a result of disabling almost all power consuming circuits, the quiescent current of the wireless power transfer system has been reduced in the sleep mode.

A plurality of wake-up sources may be employed to enable the wireless power transfer system to leave the sleep mode and enter into the active mode (normal operating mode) after an object (e.g., a mobile phone to be charged) is magnetically coupled to the wireless power transfer system. Depending on different applications and design needs, the wake-up sources of the wireless power transfer system may be implemented in various ways. For example, a wake-up signal may be generated when a user activates a switch, such as a pushbutton or a key. Alternatively, the wake-up signal may be generated by a timer. In particular, after the wireless power transfer system enters into the sleep mode, the timer is initiated. When the timer reaches a predetermined time threshold (e.g., 100 seconds), a wake-up interrupt is asserted to wake up the wireless power transfer system. Furthermore, a sensor detection apparatus such as a capacitive sensor may be used to wake up the system. After an object such as a mobile phone is placed adjacent to the capacitive sensor, the object causes a change in capacitance of the capacitive sensor. Such a change can be used to wake up the wireless power transfer system.

The wake-up solutions above cause some adverse effects such as bad user experience, unreliable operation, extra cost, delayed response, any combinations thereof and the like. It would be desirable to have a simple and reliable wake-up apparatus and method to provide a fast, accurate and user friendly wake-up solution under a variety of operating conditions.

SUMMARY

These and other problems are generally solved or circumvented, and technical advantages are generally achieved, by preferred embodiments of the present disclosure which provide an object detection apparatus for a wireless power transfer system.

In accordance with an embodiment, an apparatus comprises a power conversion device coupled to a first coil through a capacitor, and a controller configured to operate in a magnetic detection mode, wherein in the magnetic detection mode, the controller applies an excitation to the capacitor and the first coil through the power conversion device, and detects a signal having a resonant attenuation envelope, and wherein the controller is configured to determine whether an object is magnetically coupled to the first coil based on a plurality of parameters of the resonant attenuation envelope.

In accordance with another embodiment, a method comprises configuring a controller of a wireless power transfer system to operate in a sleep mode, wherein the wireless power transfer system comprises a power stage connected to a first coil through a capacitor, configuring the controller of the wireless power transfer system to operate in a magnetic detection mode, wherein in the magnetic detection mode, the controller applies an excitation to the capacitor and the first coil through the power stage, detecting a signal having a resonant attenuation envelope, wherein the signal is generated by the capacitor and the first coil in response to the excitation, and determining whether an object is magnetically coupled to the first coil based on a plurality of parameters of the resonant attenuation envelope.

In accordance with yet another embodiment, a method comprises configuring a wireless power transfer system to operate in a sleep mode to reduce a quiescent current of the wireless power transfer system, configuring the wireless power transfer system to operate in a magnetic detection mode, wherein in the magnetic detection mode, an excitation is applied to a resonant tank of the wireless power transfer system, detecting a signal having a resonant attenuation envelope, wherein the signal is generated by the resonant tank, and configuring the wireless power transfer system to operate in an active mode after finding an object is magnetically coupled to the wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an object detection apparatus for a wireless power transfer system. The invention may also be applied, however, to a variety of power systems. Hereinafter, various embodiments will be explained in detail with reference to the accompanying drawings.

Figure 1:
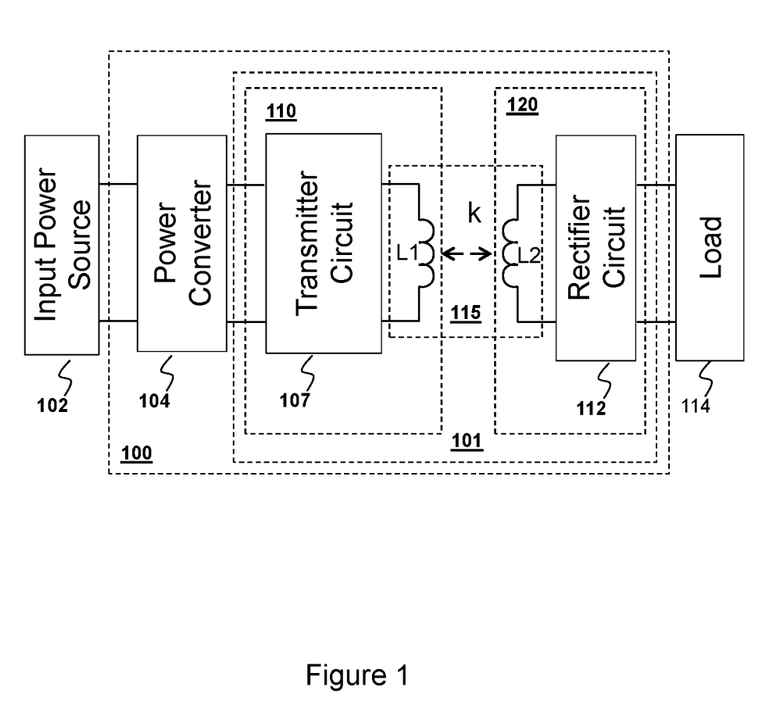
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power converter 104. The receiver 120 comprises a receiver coil L2 and a rectifier 112 connected in cascade. The output of the rectifier 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge power converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed structure of the rectifier 112 will be discussed below with respect to FIG. 2.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications. Furthermore, depending on different applications and design needs, the power converter 104 may be an optional element of the wireless power transfer system 100. In other words, the input power source 102 may be connected to the transmitter circuit 107 directly.

Figure 2:
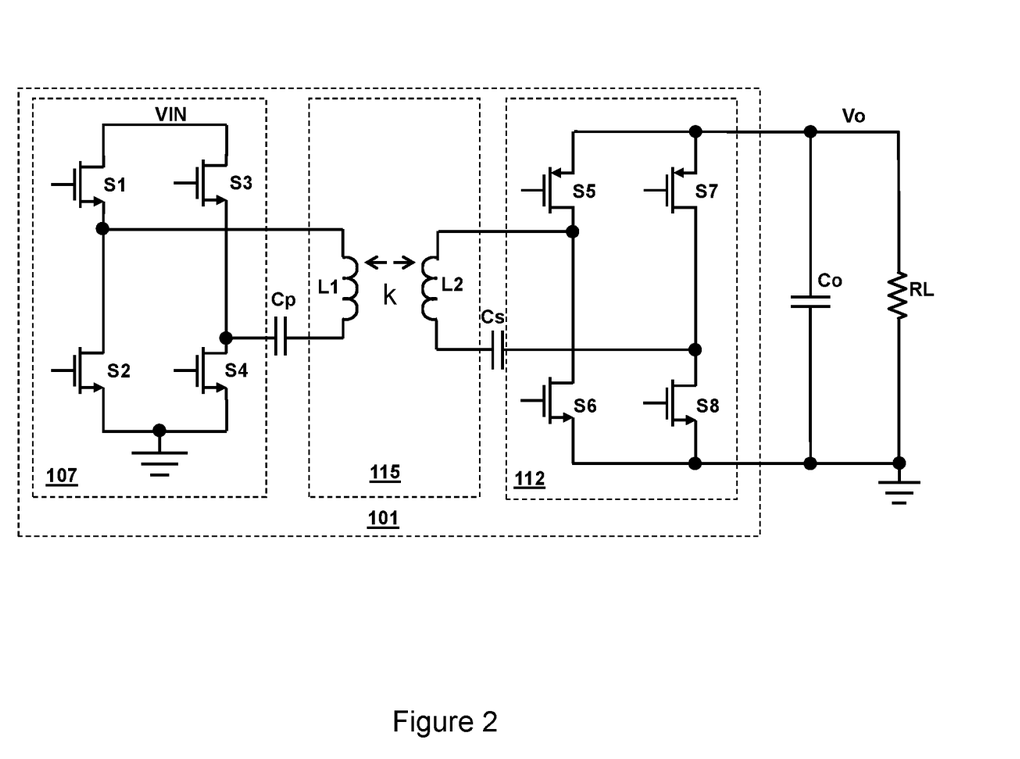
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer device 101 comprises a transmitter circuit 107, a resonant capacitor Cp, a loosely coupled transformer 115, a resonant capacitor Cs and a rectifier 112 connected in cascade. The loosely coupled transformer 115 is formed by the transmitter coil L1 and the receiver coil L2. The transmitter circuit 107 is implemented as a full-bridge as shown in FIG. 2. Throughout the description, the full-bridge shown in FIG. 2 may be alternatively referred to as a power stage.

The full-bridge 107 includes four switching elements, namely S1, S2, S3 and S4. As shown in FIG. 2, the switching elements S1 and S2 are connected in series between an input voltage bus VIN and ground. The input voltage bus VIN is connected to the output of the power converter 104 shown in FIG. 1. Likewise, the switching elements S3 and S4 are connected in series between the input voltage bus VIN and ground. The common node of the switching elements S1 and S2 is coupled to a first input terminal of the transmitter coil L1. The common node of the switching elements S3 and S4 is coupled to a second input terminal of the transmitter coil L1 through the resonant capacitor Cp.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load RL through the resonant capacitor Cs, the rectifier 112 and a capacitor Co. The rectifier converts an alternating polarity waveform received from the outputs of the receiver coil L2 to a single polarity waveform. The capacitor Co is employed to attenuate noise and provide a steady output voltage. The resonant capacitor Cs helps to achieve soft switching for the wireless power transfer system.

In some embodiments, the rectifier 112 is implemented as a synchronous rectifier. The rectifier 112 includes four switching elements, namely S5, S6, S7 and S8. As shown in FIG. 2, the switching elements S5 and S6 are connected in series between the output terminal of the rectifier 112 and ground. Likewise, the switching elements S7 and S8 are connected in series between the output terminal of the rectifier 112 and ground. As shown in FIG. 2, the common node of the switching elements S5 and S6 is coupled to a first terminal of the receiver coil L2. The common node of the switching elements S7 and S8 is coupled to a second terminal of the receiver coil L2 through the resonant capacitor Cs.

According to some embodiments, the switching elements S5, S6, S7 and S8 are implemented as MOSFET or MOSFETs connected in parallel, any combinations thereof and/or the like.

In operation, the wireless power transfer system may operate in a sleep mode when the receiver (the coil L2) is not magnetically coupled to the transmitter (the coil L1), or the receiver is not loaded. After the receiver is magnetically coupled to the transmitter, the control circuit (e.g., a controller) of the wireless power transfer system is able to detect this change, and enable the wireless power transfer system to leave the sleep mode and enter into the active mode (normal operation mode). In order to have a fast and accurate detection of this change, the control circuit of the wireless power transfer system may apply an excitation to the resonant tank through the full-bridge 107. The control circuit measures a signal (the current flowing through the resonant tank or the voltage across the resonant capacitor), and determines whether an object (e.g., the receiver) has been magnetically coupled to the transmitter. The detailed operating principle of this objection detection method and its associated system configuration will be described below with respect to FIGS. 3-6.

Figure 3:
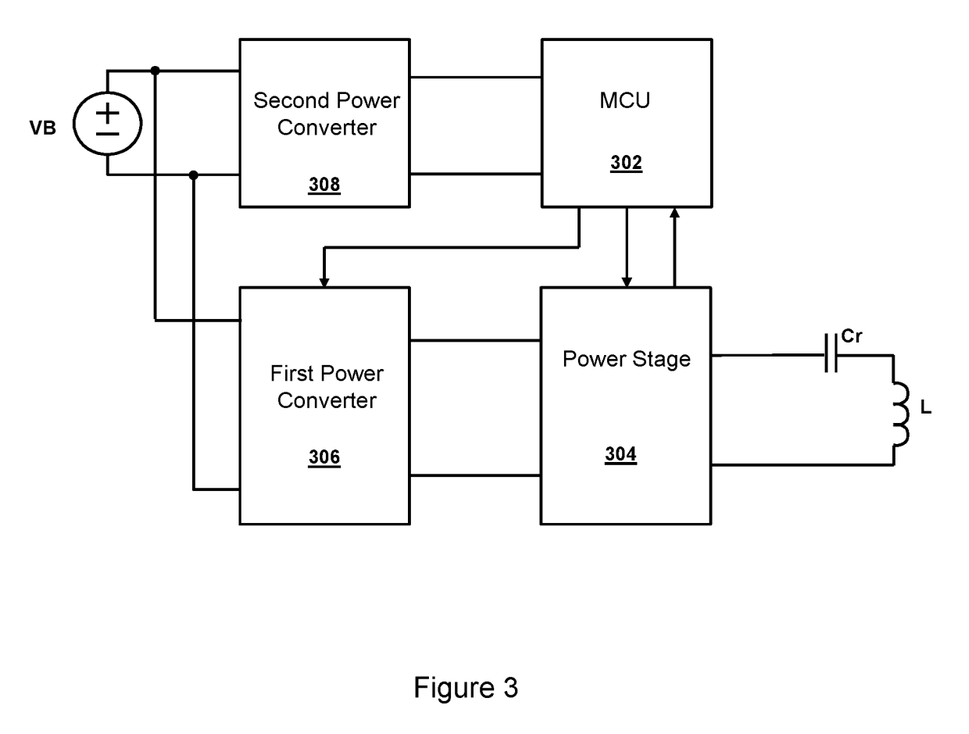
FIG. 3 illustrates an apparatus for waking up the wireless power transfer system shown in FIG. 1 in accordance with various embodiments of the present disclosure.

FIG. 3 illustrates an apparatus for waking up the wireless power transfer system shown in FIG. 1 in accordance with various embodiments of the present disclosure. The apparatus comprises a microcontroller (MCU) 302, a power stage 304, a first power converter 306, a second power converter 308, a capacitor Cr and a first coil L. As shown in FIG. 3, the power stage 304 is coupled to the first coil L through the capacitor Cr. In some embodiments, the power stage 304 is implemented as a full-bridge converter. The MCU 302 is coupled to the power stage 304 and the first power converter 306. As shown in FIG. 3, the MCU 302 is configured to receive various operating parameters from the power stage 304, and generate a plurality of operating commands to control the power stage 304 and the first power converter 306.

It should be noted that implementing the power stage 304 as a full-bridge converter is merely an example. This implementation is limited solely for the purpose of clearly illustrating the inventive aspects of the various embodiments. The present invention is not limited to any particular power topology. For example, depending on different design needs, the power stage 304 may be implemented as a half-bridge converter.

As shown in FIG. 3, the first power converter 306 is connected between an input power source VB and the power stage 304. The second power converter 308 is connected between the input power source VB and the MCU 302. The first power converter 306 and the second power converter 308 are powered by a same input power source VB.

In some embodiments, the first power converter 306 is configured to provide power for the power stage 304. The first power converter 306 may be implemented as any suitable power converter such as a buck converter, a boost converter, a buck-boost converter, a charge pump converter, any combinations thereof and the like. Throughout the description, the first power converter 306 may be alternatively referred to as a power conversion device. In some embodiments, the second power converter 308 is configured to provide power for the MCU 302. The second power converter 308 is a bias power converter. The second power converter 308 implemented as a low power buck converter.

It should be noted that implementing the second power converter 308 as a buck converter is merely an example. The present invention is not limited to any particular power topology. For example, depending on different design needs, the second power converter 308 may be implemented as a buck-boost converter.

It should be noted the block diagram shown in FIG. 3 is similar to that of the transmitter side shown in FIG. 1 except that the second power converter 308 and the MCU 302 have been added to better illustrate how an object detection apparatus can wake up the wireless power transfer system.

In operation, the wireless power transfer system may be configured to operate in various operating modes including an active mode and a sleep mode. When an object (e.g., a receiver, a mobile phone, a foreign object) is magnetically coupled to the first coil L, the wireless power transfer system is configured to operate in the active mode. In the active mode, the power is transferred between the first coil L and a second coil, which is part of the receiver. In some embodiments, the first coil is a transmitter coil. The second coil is a receiver coil.

In operation, when the wireless power transfer system is not loaded, the wireless power transfer system is idle. For reducing power consumption, the wireless power transfer system is configured to operate in the sleep mode. During the sleep mode, the power supplied to the first power converter 306 and the power stage 304 has been cut off. The power supplied to the second power converter 308 and the MCU 302 remains on for controlling the wireless power transfer system.

In the sleep mode, an object (e.g., a mobile phone) may be magnetically coupled to the first coil L. In order to improve the response time and provide better user experience, the MCU 302 may operate in a magnetic detection mode periodically.

In the sleep mode, a suitable wake-up source such as a timer may be employed to wake up the MCU 302. The timer may be part of the MCU 302. Alternatively, the timer may be a separate device outside the MCU 302. In response to the wake-up from the timer, the MCU 302 leaves the sleep mode and enters into the magnetic detection mode. In the magnetic detection mode, the MCU 302 enables the power stage 304 to perform a magnetic detection. In particular, the MCU 302 applies an excitation (e.g., a voltage pulse) to the capacitor Cr and the first coil L through the power stage 304, and receives a signal having a resonant attenuation envelope. In some embodiments, the signal having a resonant attenuation envelope is the current flowing through the resonant tank. The resonant tank is formed by the capacitor Cr and the first coil L. In alternative embodiments, the signal having a resonant attenuation envelope is the voltage across the capacitor Cr. The MCU 302 is configured to determine whether an object is magnetically coupled to the first coil L based on an attenuation coefficient and a resonant frequency of the resonant attenuation envelope. After finding an object has been coupled to the first coil L, the MCU 302 may leave the sleep mode and enter into the active mode. In the active mode, the power is transferred from the first coil L to the object so as to satisfy the power demand of the object in a fast and accurate manner.

One advantageous feature of having the magnetic detection mode is the magnetic detection mode operation does not require a dedicated mechanical element (e.g., a push button) for determining whether an object is magnetically coupled to the first coil L. Furthermore, the magnetic detection method described above provides a fast response, thereby improving user experience. This technique makes the fast and accurate object detection and identification possible.

It should be noted that the system architecture shown in FIG. 3 is based on a power transmitter (PTX). This system architecture shown in FIG. 3 is merely an example, which should not unduly limit the scope of the claims. One of ordinary skill in the art would recognize many variations, alternatives, and modifications. For example, the magnetic detection method described above may be applicable to other wireless power transfer systems such as a reverse wireless charging system in which a power receiver of a mobile phone is configured as a power transmitter.

Figure 4:
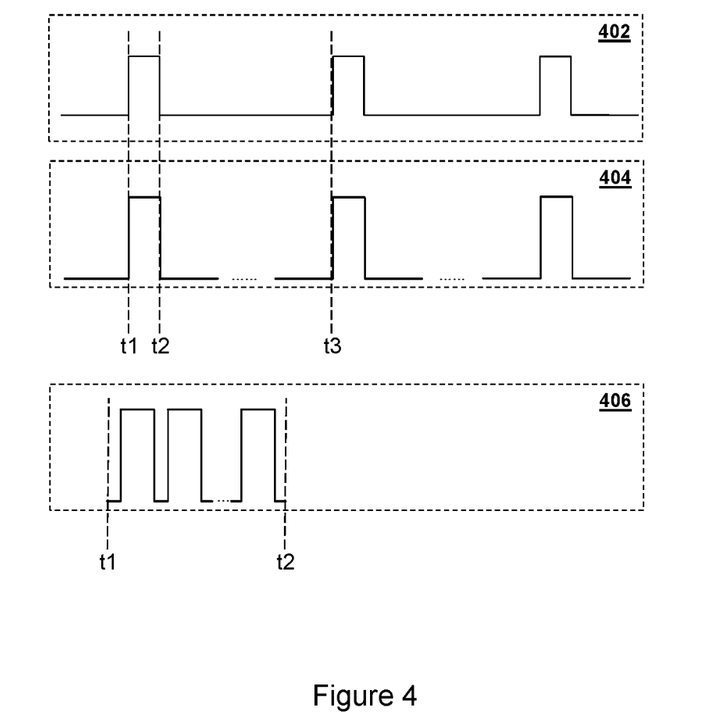
FIG. 4 illustrates various waveforms of the wireless power transfer system shown in FIG. 1 in accordance with various embodiments of the present disclosure.

FIG. 4 illustrates various waveforms of the wireless power transfer system shown in FIG. 1 in accordance with various embodiments of the present disclosure. A first waveform 402 represents the quiescent current of the wireless power transfer system. A second waveform 404 shows the time durations of the sleep mode and the magnetic detection mode. A third waveform 406 shows a plurality of voltage pulses in a period of the magnetic detection mode.

The wireless power transfer system is configured to operate in a sleep mode when the transmitter is not loaded. During the sleep mode, in order to determine whether an object is magnetically coupled to the wireless power transfer system, the wireless power transfer system may operate in a magnetic detection mode occasionally.

As shown in FIG. 4, from t1 to t2, the wireless transfer system operates in the magnetic detection mode. From t2 to t3, the wireless transfer system operates in the sleep mode. In some embodiments, the duration of the sleep mode is in a range of about 100 milliseconds to about 10 seconds. The duration of the magnetic detection mode is in a range of about 1 millisecond to about 50 milliseconds.

As shown in FIG. 4, the quiescent current during the magnetic detection mode is higher than the quiescent current during the sleep mode. In the sleep mode, the quiescent current may be in a range from about 1 microampere to about 10 microamperes. The quiescent current of the magnetic detection mode may be higher than about 100 microamperes. The total quiescent current is the average current of the currents in the sleep mode and the magnetic detection mode. The average current can be expressed by the following equation:

$$I_{quiescent} = \frac{I_{quiescent\_mag\_detect} \times (t2 - t1) + I_{quiescent\_sleep} \times (t3 - t2)}{t3 - t1} \quad (1)$$

In Equation (1), $I_{quiescent\_mag\_detect}$ is the quiescent current of the magnetic detection mode. As shown in FIG. 4, (t2−t1) represents the duration of the magnetic detection mode. Likewise, $I_{quiescent\_sleep}$ is the quiescent current of the sleep mode. As shown in FIG. 4, (t3−t2) represents the duration of the sleep mode. Furthermore, (t3−t1) represents the total time of the magnetic detection mode and the sleep mode.

As indicated by Equation (1), the total quiescent current can be adjusted by changing the ratio of the duration of the sleep mode to the duration of the magnetic detection mode. In some embodiments, the ratio of the duration of the sleep mode to the duration of the magnetic detection mode is greater than 10. As a result of having this ratio, the total quiescent current is less than 100 microamperes.

FIG. 4 further illustrates in the magnetic detection mode, there may be a plurality of magnetic detection tests. As indicated by the third waveform 406, during the magnetic detection mode (from t1 to t2), a plurality of magnetic detection tests may be applied to the resonant tank for further improving the detection accuracy. Each magnetic detection test may be implemented as a voltage pulse. In some embodiments, the number of the magnetic detection tests is in a range from about 1 to about 10.

Figure 5:
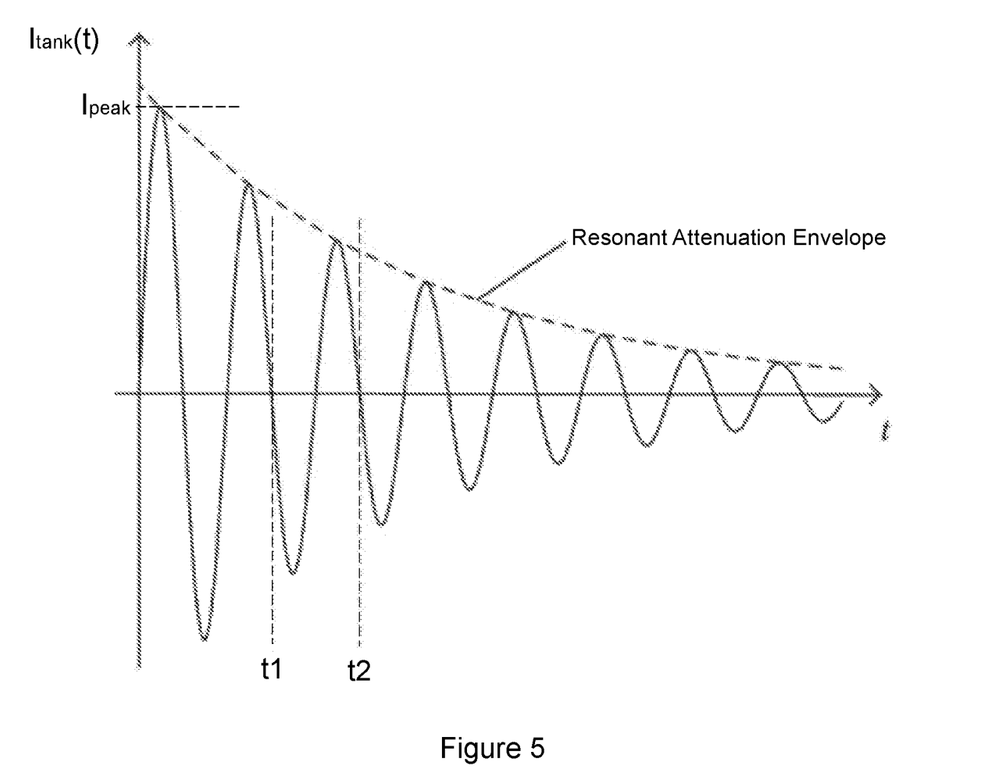
FIG. 5 illustrates a current having a resonant attenuation envelope in accordance with various embodiments of the present disclosure.

FIG. 5 illustrates a current having a resonant attenuation envelope in accordance with various embodiments of the present disclosure. After an excitation (e.g., a voltage pulse) is applied to the resonant tank formed by a coil and a resonant tank, the current flowing through the resonant tank is a current having a resonant attenuation envelope as shown in FIG. 5.

The current flowing through the resonant tank can be expressed as:

$$I_{tank}(t) = I_{peak} \times e^{\left(-\frac{t}{\tau}\right)} \times \sin(\omega t) \quad (2)$$

In Equation (2), $I_{peak}$ is the initial peak value as shown in FIG. 5. The initial peak value is a predetermined value, which depends on the amplitude of the excitation. τ is the attenuation coefficient of the resonant attenuation envelope. ω is the resonant frequency of the resonant attenuation envelope. The attenuation coefficient of the resonant attenuation envelope can be expressed by the following equation:

$$\tau = \frac{2 \cdot L}{R} \quad (3)$$

The resonant frequency of the resonant attenuation envelope can be expressed by the following equation:

$$\omega = 2 \cdot \pi \cdot f = \frac{1}{\sqrt{L \cdot C}} \quad (4)$$

In Equation (3), L is the equivalent inductance of the resonant tank. R is the equivalent resistance of the resonant tank. In Equation (4), C is the capacitance of the resonant tank.

In operation, different objects may be magnetically coupled to the resonant tank through the coil L. Different objects may have different impacts on the values of L and R. As such, the values of R and L may represent which type of object has been magnetically coupled to the coil L shown in FIG. 3. Furthermore, the values of R and L also indicate whether an object has been magnetically coupled to the coil L.

In operation, the values of R and L may be predetermined through suitable characterization tests. The predetermined values of R and L may be stored in a lookup table. The MCU 302 applies an excitation to the resonant tank through the power stage 304. A suitable device such as a current sensor may be employed to measure the current flowing through the resonant tank. The MCU 302 receives the measured current. An algorithm is used to analyze the measured current (e.g., the current waveform shown in FIG. 5) to obtain the attenuation coefficient and the resonant frequency. As indicated by Equations (3) and (4), the algorithm is able to acquire the values of L and R based on the attenuation coefficient and the resonant frequency. By comparing the measured values of R and L with the values of R and L stored in the lookup table, the algorithm can determine whether an object has been magnetically coupled to the coil L. Furthermore, if an object has been magnetically coupled to the coil L, the algorithm can further determine which type of object has been magnetically coupled to the coil L.

It should be noted that the magnetic detection method described above with respect to the current waveform is applicable to the voltage signal across the resonant capacitor. The voltage across the resonant capacitor of the resonant tank can be expressed as:

$$V_C(t) = V_{peak} \times e^{\left(-\frac{t}{\tau}\right)} \times \sin(\omega t) \quad (5)$$

In Equation (5), $V_{peak}$ is the initial peak value of the voltage across the resonant capacitor. Equation (5) is similar to Equation (2). As such, the magnetic detection method described above is applicable to Equation (5). By analyzing the measured voltage across the resonant capacitor, the algorithm can determine whether an object has been magnetically coupled to the coil L. Furthermore, if an object has been magnetically coupled to the coil L, the algorithm can further determine which type of object has been magnetically coupled to the coil L.

Figure 6:
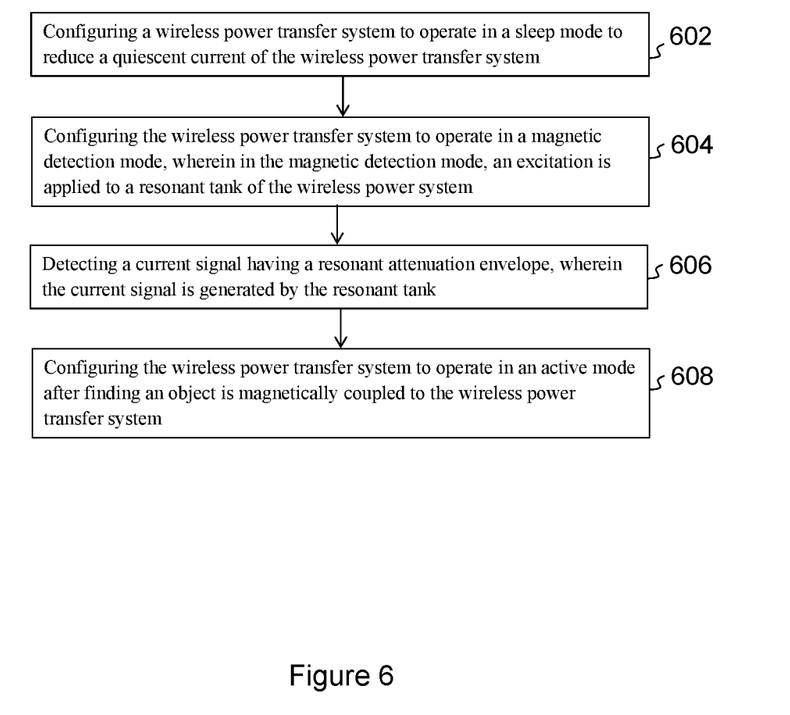
FIG. 6 illustrates a flow chart of a method for controlling the wireless power transfer system shown in FIG. 1 in accordance with various embodiments of the present disclosure.

FIG. 6 illustrates a flow chart of a method for controlling the wireless power transfer system shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

A wireless power transfer system comprises a transmitter and a receiver. The transmitter comprises a power stage, a resonant capacitor and a transmitter coil. The receiver comprises a receiver coil and a rectifier. The transmitter coil is magnetically coupled to the receiver coil. In some embodiments, the transmitter may be a charging pad. The receiver may be a mobile phone.

In operation, the receiver (e.g., the mobile phone) may be not magnetically coupled to the transmitter (e.g., the charging pad). In other words, the transmitter is not loaded. In order to reduce the power consumption of the transmitter, the transmitter and the associated control circuits may enter into a sleep mode. In the sleep mode, almost all power has been cut off to reduce the quiescent current of the transmitter, thereby reducing the power consumption. Only the power supplied to the wake-up sources remains on. In the sleep mode, the receiver (e.g., the mobile phone) may be magnetically coupled to the transmitter (e.g., the charging pad) again. The magnetic coupling between the receiver and the transmitter demands a mode change (from the sleep mode to an active mode) in a fast and accurate manner. In order to improve the user experience, a magnetic detection mode has been employed to provide a fast and accurate transition from the sleep mode to the active mode.

At step 602, a wireless power transfer system is not loaded. The wireless power transfer system is configured to operate in a sleep mode to reduce the quiescent current of the wireless power transfer system. During the sleep mode, the power supplied to the power stage of the wireless power transfer system has been cut off. Only the power supplied to the wake-up sources remains on for controlling the wireless power transfer system.

At step 604, after staying in the sleep mode for a predetermined duration, the wireless power transfer system is configured to operate in a magnetic detection mode. In the magnetic detection mode, the power stage of the wireless power transfer system is enabled. An excitation (e.g., a voltage pulse or a plurality of voltage pulses) is applied to a resonant tank of the wireless power transfer system through the power stage.

At step 606, a current flowing through the resonant tank is detected. The current is of a resonant attenuation envelope. An algorithm is employed to measure the attenuation coefficient and the resonant frequency of the current from the resonant attenuation envelope. The algorithm is able to determine whether an object (e.g., a receiver) is magnetically coupled to the wireless power transfer system.

It should be noted determining whether an object (e.g., a receiver) is magnetically coupled to the wireless power transfer system based on the parameters of the current flowing through the resonant tank is merely an example. In alternative embodiments, the algorithm is able to determine whether an object (e.g., a receiver) is magnetically coupled to the wireless power transfer system based on the parameters of the voltage across the resonant capacitor of the resonant tank.

At step 608, the wireless power transfer system is configured to operate in the active mode after finding an object (e.g., a receiver) is magnetically coupled to the wireless power transfer system.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a power conversion device coupled to a first coil of the apparatus through a capacitor of the apparatus; and
   a controller configured to operate in a magnetic detection mode after operating in a sleep mode having a duration at least ten times greater than a duration of the magnetic detection mode, wherein as a result of having a sleep/magnetic detection ratio greater than or equal to ten, a total quiescent current is less than 100 microamperes, and wherein in the sleep mode, the controller is configured to sleep and wake up prior to entering into the magnetic detection mode, and wherein in the magnetic detection mode, a plurality of magnetic detection tests is applied to the first coil and the capacitor, and wherein in each of the plurality of magnetic detection tests, the controller applies a voltage pulse to the capacitor and the first coil through the power conversion device, and detects a signal having a resonant attenuation envelope in response to the voltage pulse, and wherein the controller is configured to determine whether an object is magnetically coupled to the first coil based on a plurality of parameters of the resonant attenuation envelope.

2. The apparatus of claim 1, wherein:
   the power conversion device is a full-bridge converter.

3. The apparatus of claim 1, wherein:
   the controller is configured to determine whether the object is magnetically coupled to the first coil based on an attenuation coefficient and a resonant frequency of the resonant attenuation envelope.

4. The apparatus of claim 1, further comprising:
   a first power converter configured to provide power for the power conversion device; and
   a second power converter configured to provide power for the controller, wherein the first power converter and the second power converter are powered by a same input power source.

5. The apparatus of claim 4, wherein:
   the second power converter is a low power buck converter configured to provide bias power for the controller.

6. The apparatus of claim 1, wherein:
the first coil is configured to be magnetically coupled to a second coil, and wherein:
the first coil is a transmitter coil of a wireless power transfer system; and
the second coil is a receiver coil of the wireless power transfer system.

7. The apparatus of claim 1, wherein:
a duration of the sleep mode is in a range of about 100 milliseconds to about 10 seconds; and
a duration of the magnetic detection mode is in a range of about 1 millisecond to about 50 milliseconds.

8. The apparatus of claim 1, wherein:
the signal is detected from a current flowing into a resonant tank formed by the capacitor and the first coil.

9. A method comprising:
configuring a controller of a wireless power transfer system to operate in a sleep mode, wherein the wireless power transfer system comprises a power stage connected to a first coil through a capacitor, and a bias power converter configured to provide power for the controller, and wherein the power stage and the bias power converter are supplied by a same power source, and wherein in the sleep mode, power supplied to the power stage has been cut off, and power supplied to the bias power converter remains on for controlling the wireless power transfer system;
configuring the controller of the wireless power transfer system to operate in a magnetic detection mode, wherein a duration of the sleep mode is at least ten times greater than a duration of the magnetic detection mode, and wherein as a result of having a sleep/magnetic detection ratio greater than or equal to ten, a total quiescent current is less than 100 microamperes, and wherein in the sleep mode, the controller is configured to sleep and wake up prior to entering into the magnetic detection mode, and wherein in the magnetic detection mode, a plurality of magnetic detection tests is applied to the first coil and the capacitor, and wherein in each of the plurality of magnetic detection tests, the controller applies a voltage pulse to the capacitor and the first coil through the power stage;
detecting a signal having a resonant attenuation envelope, wherein the signal is generated by the capacitor and the first coil in response to the voltage pulse; and
determining whether an object is magnetically coupled to the first coil based on a plurality of parameters of the resonant attenuation envelope.

10. The method of claim 9, further comprising:
after finding that the object is magnetically coupled to the first coil, configuring the wireless power transfer system to operate in an active mode, wherein during the active mode, power is transferred between the first coil and a second coil, and wherein the second coil is part of the object.

11. The method of claim 9, further comprising:
determining whether the object is magnetically coupled to the first coil based on an attenuation coefficient and a resonant frequency of the resonant attenuation envelope.

12. The method of claim 9, further comprising:
in the magnetic detection mode, applying a plurality of voltage pulses to a resonant tank formed by the first coil and the capacitor; and
sensing a current flowing through the resonant tank, wherein the signal having the resonant attenuation envelope is obtained based on a waveform of the current flowing through the resonant tank.

13. The method of claim 12, further comprising:
determining an attenuation coefficient of the resonant attenuation envelope based on the waveform of the current flowing through the resonant tank; and
determining a resonant frequency of the resonant attenuation envelope based on the waveform of the current flowing through the resonant tank.

14. The method of claim 9, further comprising:
in the magnetic detection mode, applying a plurality of voltage pulses to a resonant tank formed by the first coil and the capacitor; and
sensing a voltage across the capacitor of the resonant tank, wherein the signal having the resonant attenuation envelope is obtained based on a waveform of the voltage across the capacitor of the resonant tank.

15. A method comprising:
configuring a wireless power transfer system to operate in a sleep mode to reduce a quiescent current of the wireless power transfer system, wherein in the sleep mode, power supplied to a power stage of the wireless power transfer system has been cut off, and power supplied to a bias power converter remains on for controlling the wireless power transfer system;
configuring the wireless power transfer system to operate in a magnetic detection mode, wherein a duration of the sleep mode is at least ten times greater than a duration of the magnetic detection mode, and wherein as a result of having a sleep/magnetic detection ratio greater than or equal to ten, a total quiescent current is less than 100 microamperes, and wherein in the sleep mode, the controller is configured to sleep and wake up prior to entering into the magnetic detection mode, and wherein in the magnetic detection mode, a plurality of magnetic detection tests is applied to a resonant tank of the wireless power transfer system, and wherein in each of the plurality of magnetic detection tests, a voltage pulse is applied to the resonant tank of the wireless power transfer system;
detecting a signal having a resonant attenuation envelope in response to the voltage pulse, wherein the signal is generated by the resonant tank; and
configuring the wireless power transfer system to operate in an active mode after finding an object is magnetically coupled to the wireless power transfer system.

16. The method of claim 15, wherein the wireless power transfer system comprises:
the resonant tank comprising a resonant capacitor and a first coil;
the power stage connected to the resonant tank;
a controller configured to determine whether the object is magnetically coupled to the first coil;
a first power converter configured to provide power for the power stage; and
the bias power converter configured to provide power for the controller, wherein the first power converter and the bias power converter are powered by a same input power source.

17. The method of claim 16, wherein:
the power stage is a full-bridge power converter; and
the first power converter and the bias power converter are non-isolated power converters.

18. The method of claim 17, further comprising:
detecting the signal having the resonant attenuation envelope generated by the resonant capacitor and the first coil; and determining whether the object is magnetically coupled to the first coil based on an attenuation coefficient and a resonant frequency of the resonant attenuation envelope.

\* \* \* \* \*